(12) United States Patent
Gangloff, Jr. et al.

(10) Patent No.: US 11,773,783 B2
(45) Date of Patent: Oct. 3, 2023

(54) FLEXIBLE SENSOR SYSTEM FOR PROGNOSTIC HEALTH MONITORING OF COMPOSITE AEROSTRUCTURES

(71) Applicant: Raytheon Technologies Corporation, Farmington, CT (US)

(72) Inventors: John J. Gangloff, Jr., Middletown, CT (US); Callum Bailey, Lakewood Ranch, FL (US); Wenping Zhao, Glastonbury, CT (US); Steven M. Kestler, San Diego, CA (US); Sameh Dardona, Thuwal (SA)

(73) Assignee: RTX CORPORATION, Farmington, CT (US)

( * ) Notice: Subject to any disclaimer, the term of this patent is extended or adjusted under 35 U.S.C. 154(b) by 439 days.

(21) Appl. No.: 16/858,014

(22) Filed: Apr. 24, 2020

(65) Prior Publication Data
US 2021/0332760 A1  Oct. 28, 2021

(51) Int. Cl.
| | |
|---|---|
| *F02C 7/24* | (2006.01) |
| *B32B 3/12* | (2006.01) |
| *B32B 3/26* | (2006.01) |
| *G01K 7/16* | (2006.01) |
| *G01L 1/16* | (2006.01) |
| *G01L 1/22* | (2006.01) |

(52) U.S. Cl.
CPC .............. *F02C 7/24* (2013.01); *B32B 3/12* (2013.01); *B32B 3/266* (2013.01); *G01K 7/16* (2013.01); *G01L 1/16* (2013.01); *G01L 1/22* (2013.01); *F05D 2260/80* (2013.01); *F05D 2260/963* (2013.01)

(58) Field of Classification Search
CPC ... B23B 3/266; B23B 3/12; F02C 7/24; F02C 9/48; G02B 6/3632; G02B 6/3664; G02B 6/3668; F02K 1/06; F02K 1/17; F02K 1/165; F05D 2270/30; F05D 2220/323; G01L 1/242; F04D 27/001
See application file for complete search history.

(56) References Cited

U.S. PATENT DOCUMENTS

| | | | |
|---|---|---|---|
| 6,370,964 B1 * | 4/2002 | Chang | G01M 5/0033 73/862.046 |
| 7,972,885 B1 * | 7/2011 | Dutta | H01L 31/0352 257/E21.189 |

(Continued)

FOREIGN PATENT DOCUMENTS

| | | |
|---|---|---|
| CN | 108982003 B | 1/2020 |
| KR | 1987211 | 6/2019 |

OTHER PUBLICATIONS

EP search report for EP21169967.3 dated Aug. 11, 2021.

*Primary Examiner* — Todd E Manahan
*Assistant Examiner* — Rodolphe Andre Chabreyrie
(74) *Attorney, Agent, or Firm* — Getz Balich LLC

(57) ABSTRACT

A sensor array system includes a skin. The sensor array system includes a lattice network coupled to a portion of the skin. The lattice network includes a plurality of interconnects and a plurality of nodes. The plurality of nodes are respectively defined by an intersection of two or more interconnects of the plurality of interconnects. The sensor array system includes a first sensor electrically connected to the lattice network at a first node of the plurality of nodes.

15 Claims, 15 Drawing Sheets

(56) References Cited

U.S. PATENT DOCUMENTS

| | | | |
|---|---|---|---|
| 8,534,133 B2* | 9/2013 | Hucker | H01Q 1/28 |
| | | | 73/777 |
| 9,586,699 B1 | 3/2017 | Vail, III | |
| 10,368,401 B2 | 7/2019 | Wen | |
| 10,645,803 B2* | 5/2020 | Majidi | H05K 1/189 |
| 2004/0066188 A1* | 4/2004 | Goldfine | G01R 33/12 |
| | | | 324/228 |
| 2007/0275212 A1* | 11/2007 | Stadtlander | B29C 73/10 |
| | | | 428/116 |
| 2011/0118990 A1* | 5/2011 | Sidhu | G01B 7/16 |
| | | | 702/35 |
| 2013/0275057 A1 | 10/2013 | Perlin | |
| 2015/0367586 A1* | 12/2015 | Georgeson | G01N 29/228 |
| | | | 264/40.1 |
| 2016/0265383 A1* | 9/2016 | Pujar | F02K 1/78 |
| 2016/0328043 A1 | 11/2016 | Moller | |
| 2017/0136694 A1 | 5/2017 | Rezai | |
| 2017/0150602 A1* | 5/2017 | Johnston | H05K 1/115 |
| 2018/0321184 A1* | 11/2018 | Mackin | H01L 29/22 |
| 2019/0008065 A1 | 1/2019 | Dalal | |
| 2020/0072807 A1* | 3/2020 | Jang | H01L 21/02527 |

* cited by examiner

FLEXIBLE SENSOR SYSTEM FOR PROGNOSTIC HEALTH MONITORING OF COMPOSITE AEROSTRUCTURES

BACKGROUND

This disclosure relates generally to sensor arrays for gas turbine engines, and more particularly to network sensor arrays.

Component monitoring is a safety and cost saving factor for a wide variety of aerospace, commercial, and infrastructure components, with examples including aircraft components, road bridges, and automotive vehicles. The monitoring of parameters on a component can be helpful in monitoring the lifecycle of that component, including the detection of component failure, or the detection of parameters that can lead to failure.

A sensor that monitors a particular parameter at a particular point on a component is mounted on or embedded in the surface of the component. Additionally, electrical circuitry is also generally required for component monitoring. Individual sensors that are mounted on or near the surface of a component can be helpful in the monitoring of that component. However, it can be preferable to have a greater number of sensors for monitoring various parameters of a component. The accompanying increase in size and/or weight of the component monitoring system can have an adverse effect on the structural properties of the monitored surface, and/or the performance of the component.

As the surface area density of monitoring points on a component increases, the associated size and/or weight of the electrical interconnects and the associated circuitry for those sensors also increases. Moreover, as the monitored surface area of a component increases, so too can the difficulty in fabricating the large network of sensors and associated routing interconnects. Manufacturing limitations can affect the ability to fabricate a sensor network for components having a larger monitored surface area. As the number of sensors on a sensor network increases, so too does the complexity of circuitry that provides external electrical connections to each of the sensors on the network. This can reduce the number of sensors that can be deployed on a particular sensor network. Accordingly, what is needed is a sensor network addressing one or more of the above-noted concerns.

SUMMARY

It should be understood that any or all of the features or embodiments described herein can be used or combined in any combination with each and every other feature or embodiment described herein unless expressly noted otherwise.

According to an embodiment of the present disclosure, a sensor array system includes a skin. The sensor array system includes a lattice network coupled to a portion of the skin. The lattice network includes a plurality of interconnects and a plurality of nodes. The plurality of nodes are respectively defined by an intersection of two or more interconnects of the plurality of interconnects. The sensor array system includes a first sensor electrically connected to the lattice network at a first node of the plurality of nodes.

In the alternative or additionally thereto, in the foregoing embodiment, the sensor array system includes an input-output circuit connected to the lattice network at a second node of the plurality of nodes.

In the alternative or additionally thereto, in the foregoing embodiment, the composite skin includes an aperture extending through the composite skin at the location of the second node and the input-output circuit includes at least one cable extending through the aperture.

In the alternative or additionally thereto, in the foregoing embodiment, the portion of the composite skin includes a non-planar surface.

In the alternative or additionally thereto, in the foregoing embodiment, the composite skin includes a first composite layer and a second composite layer applied to the first composite layer and the lattice network is mounted to the portion of the composite skin between the first composite layer and the second composite layer.

In the alternative or additionally thereto, in the foregoing embodiment, the first sensor includes one of a resistance temperature detector, a strain sensor, or a piezoelectric sensor.

In the alternative or additionally thereto, in the foregoing embodiment, the sensor array system includes a second sensor electrically connected to the lattice network at a second node of the plurality of nodes and the second sensor is different than the first sensor.

In the alternative or additionally thereto, in the foregoing embodiment, the sensor array system includes a substrate disposed between the portion of the composite skin and the lattice network.

According to another embodiment of the present disclosure, a gas turbine engine includes an engine core having a longitudinal center axis. The gas turbine engine includes an inner fixed structure disposed circumferentially about the engine core. The gas turbine engine includes an acoustic panel mounted to an exterior surface of the inner fixed structure. The acoustic panel includes a first composite skin, a second composite skin radially outward of the first composite skin, and a core structure mounted between and connecting the first composite skin and the second composite skin. The second composite skin includes apertures defined therein. The acoustic panel includes a sensor array including a lattice network mounted to a portion of the first composite skin. The lattice network includes a plurality of interconnects and at least one node defined by an intersection of two or more interconnects of the plurality of interconnects. The sensor array includes a first sensor electrically connected to the lattice network at a first node of the at least one node.

In the alternative or additionally thereto, in the foregoing embodiment, the portion of the first composite skin is located on a radially exterior side of the first composite skin.

In the alternative or additionally thereto, in the foregoing embodiment, the gas turbine engine includes a thermal blanket disposed between the inner fixed structure and the acoustic panel.

In the alternative or additionally thereto, in the foregoing embodiment, the portion of the first composite skin is located on a radially interior side of the first composite skin and the sensor array is disposed between the thermal blanket and the first composite skin.

According to another embodiment of the present disclosure, a method for forming a sensor array includes forming the sensor array by applying a lattice network to a substrate. The lattice network includes a plurality of interconnects and a plurality of nodes. Each node of the plurality of nodes is defined by an intersection of two or more interconnects of the plurality of interconnects. The method includes mounting the lattice network to a portion of a composite skin. The method includes electrically connecting a first sensor to the lattice network at a first node of the plurality of nodes.

In the alternative or additionally thereto, in the foregoing embodiment, the lattice network is coupled to the composite skin with the lattice network and the composite skin in an uncured state.

In the alternative or additionally thereto, in the foregoing embodiment, the method includes curing the lattice network and the composite skin together.

In the alternative or additionally thereto, in the foregoing embodiment, the method includes laser cutting substrate material from the sensor array after applying the lattice network to the substrate and before mounting the lattice network to the portion of the composite skin.

In the alternative or additionally thereto, in the foregoing embodiment, mounting the lattice network to the portion of the composite skin includes mounting the substrate to the composite skin so that the substrate is disposed between the portion of the composite skin and the lattice network.

In the alternative or additionally thereto, in the foregoing embodiment, the substrate includes a sacrificial substrate. The method includes chemically removing the sacrificial substrate from the lattice network.

In the alternative or additionally thereto, in the foregoing embodiment, the method includes applying an encapsulation layer to the lattice network.

In the alternative or additionally thereto, in the foregoing embodiment, the method includes mounting a core structure to the portion of the composite skin after mounting the lattice network to the portion of the composite skin.

The present disclosure, and all its aspects, embodiments and advantages associated therewith will become more readily apparent in view of the detailed description provided below, including the accompanying drawings.

DETAILED DESCRIPTION

Figure 1:
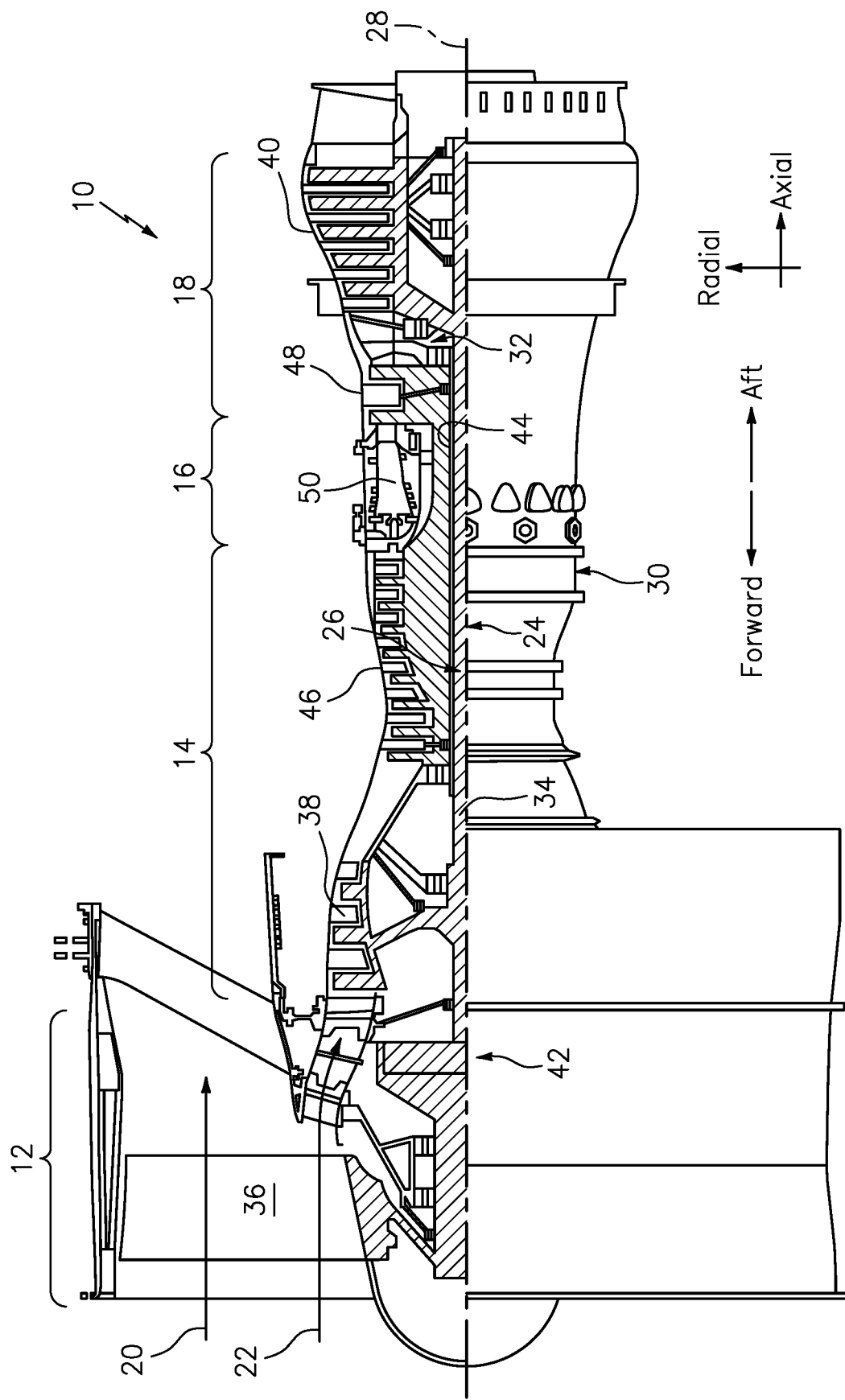
FIG. 1 illustrates a side cross-sectional view of a gas turbine engine, in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Referring to FIG. 1, an exemplary gas turbine engine 10 is schematically illustrated. The gas turbine engine 10 is disclosed herein as a two-spool turbofan engine that generally includes a fan section 12, a compressor section 14, a combustor section 16, and a turbine section 18. The fan section 12 drives air along a bypass flow path 20 while the compressor section 14 drives air along a core flow path 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those with three-spool architectures.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. The high-pressure spool 26 generally includes a second shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44.

Airflow along the core flow path 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively, in response to the expansion.

Figure 2:
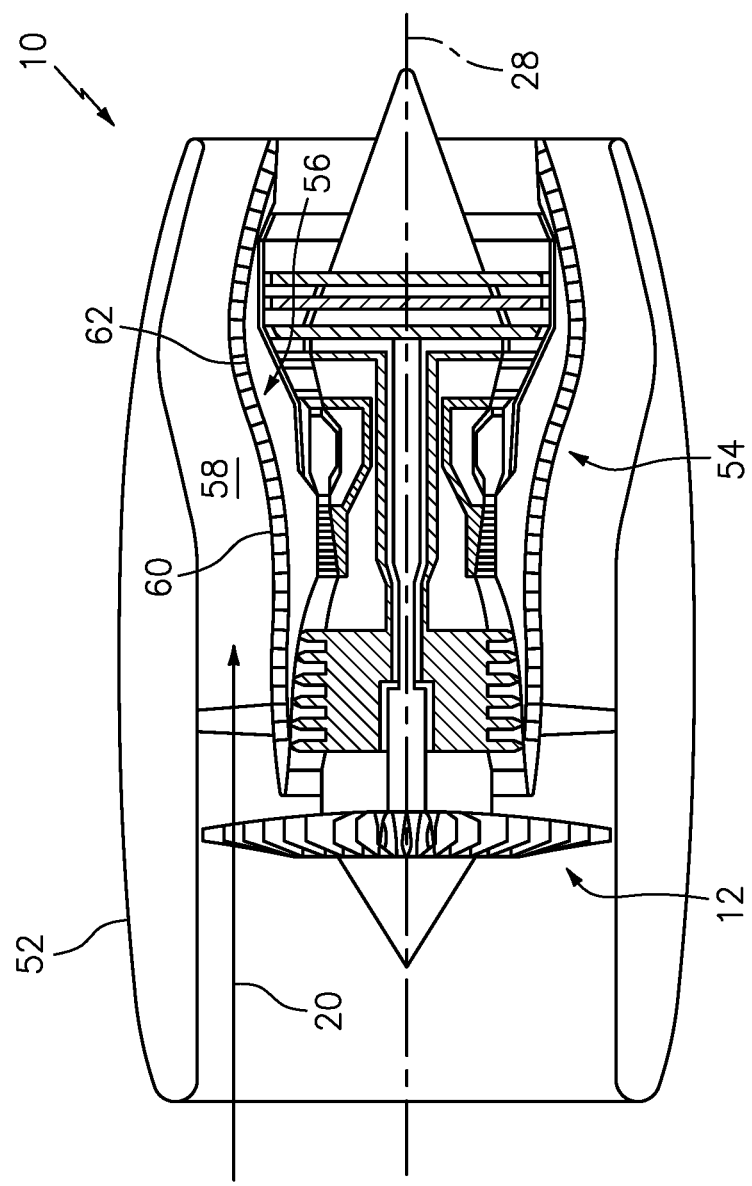
FIG. 2 illustrates another side cross-sectional view of a gas turbine engine, in accordance with one or more embodiments of the present disclosure.

Referring to FIG. 2, the gas turbine engine 10 includes a nacelle 52 forming an outer perimeter of the gas turbine engine 10 and serving to generally house an engine core 54. The engine core 54 includes an inner fixed structure 56 circumferentially surrounding the engine core 54, with respect to the longitudinal centerline 28. A bypass air duct 58 is disposed downstream of the fan section 12 and is generally defined radially between the nacelle 52 and the inner fixed structure 56 of the engine core 54. At least a portion of the air entering the gas turbine engine 10 via the fan section 12 will pass through the bypass air duct 58 along the bypass flow path 20. In various embodiments, the nacelle 52 may include, for example, portions of a fan cowl or a thrust reverser such as, for example, a thrust reverser translating sleeve (see, e.g., FIG. 13).

In various embodiments, the gas turbine engine 10 may include an acoustic panel 60 coupled to a radially surface 62 of the inner fixed structure 56, for the attenuation of acoustic energy in proximity to the acoustic panel 60. The surface 62 may be on a radially inward surface, a radially outward surface, or as an interior component in a composite. Accordingly, the acoustic panel 60 may define a portion of the bypass flow path 20 within the bypass air duct 58.

Figure 3:
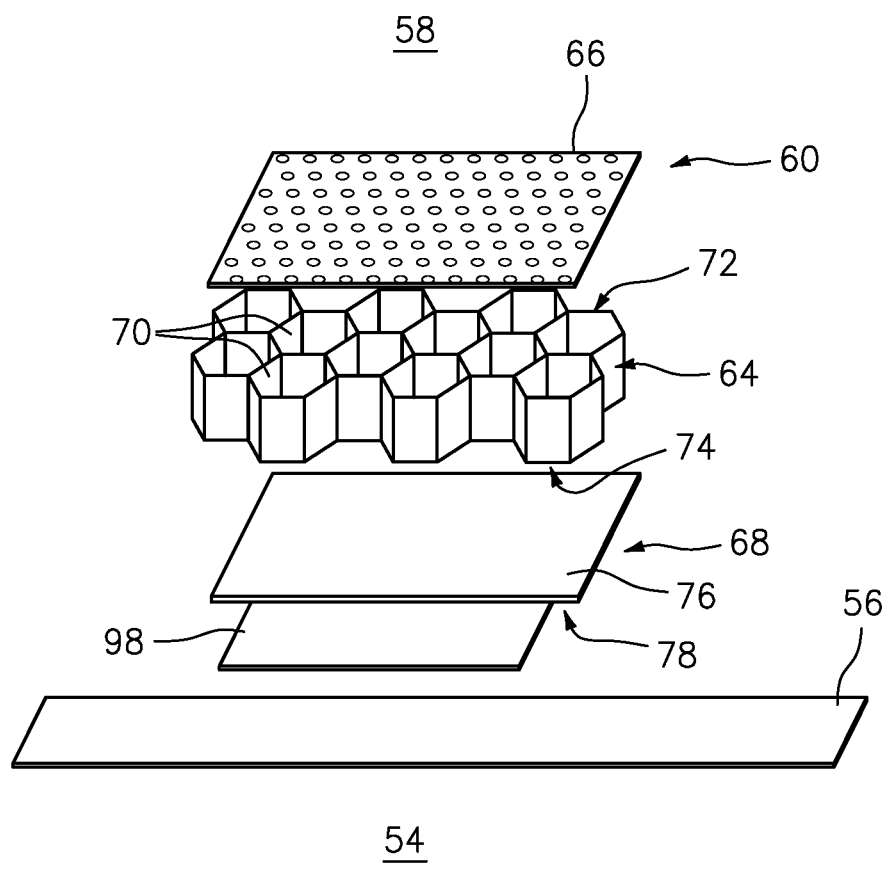
FIG. 3 illustrates an exploded view of a portion of an acoustic panel, in accordance with one or more embodiments of the present disclosure.
Figure 4:
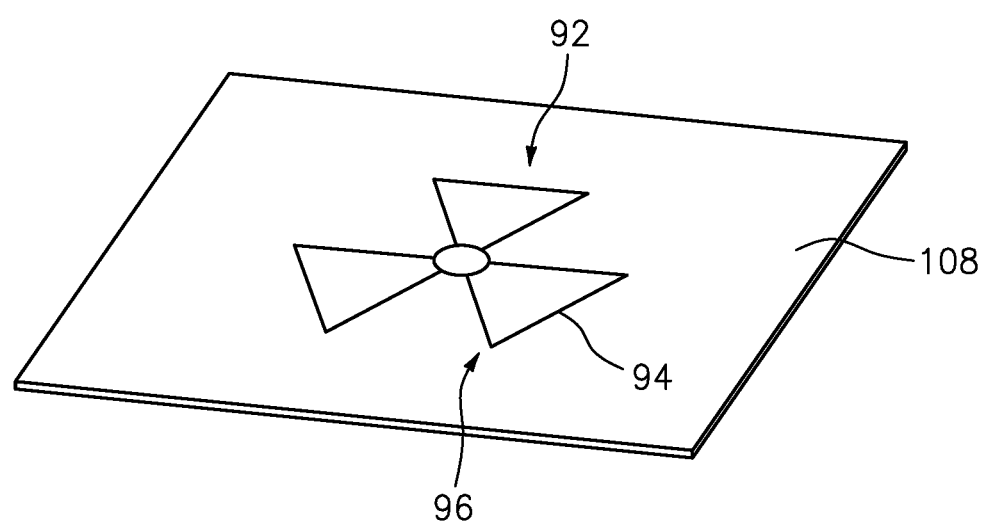
FIG. 4 illustrates a portion of a sensor array at a stage of manufacture, in accordance with one or more embodiments of the present disclosure.

Referring to FIGS. 2 and 3, the acoustic panel 60 generally includes a core structure 64 positioned between a perforated face skin 66 and a non-perforated back skin 68. Perforated will be understood to reference apertures in the surface generally, for example, including apertures formed by a perforation and apertures formed as part of a formation process of the skin 66. The core structure 64 may include a plurality of cells 70 extending between a first side 72 of the core structure 64 and a second side 74 of the core structure 64 opposite the first side 72 of the core structure 64. The face skin 66 and the back skin 68 provide opposing ends of the plurality of cells 70 along the first side 72 and the second side 74 of the core structure 64, respectively. The back skin 68 includes a first side 76 which faces the core structure 64 and an opposing second side 78 which faces the inner fixed structure 56. In various embodiments, a thermal blanket 98 may be disposed between the acoustic panel 60 and the inner fixed structure 56 to protect the acoustic panel 60 from heat emitted by the engine core 54.

Figure 12:
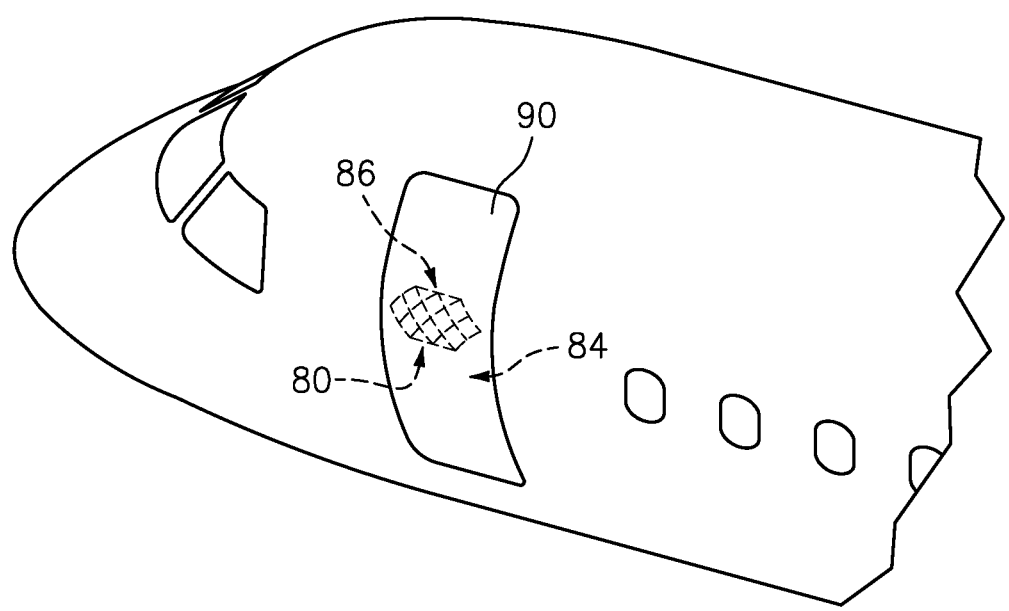
FIG. 12 illustrates an exemplary component including a sensor array, in accordance with one or more embodiments of the present disclosure.
Figure 13:
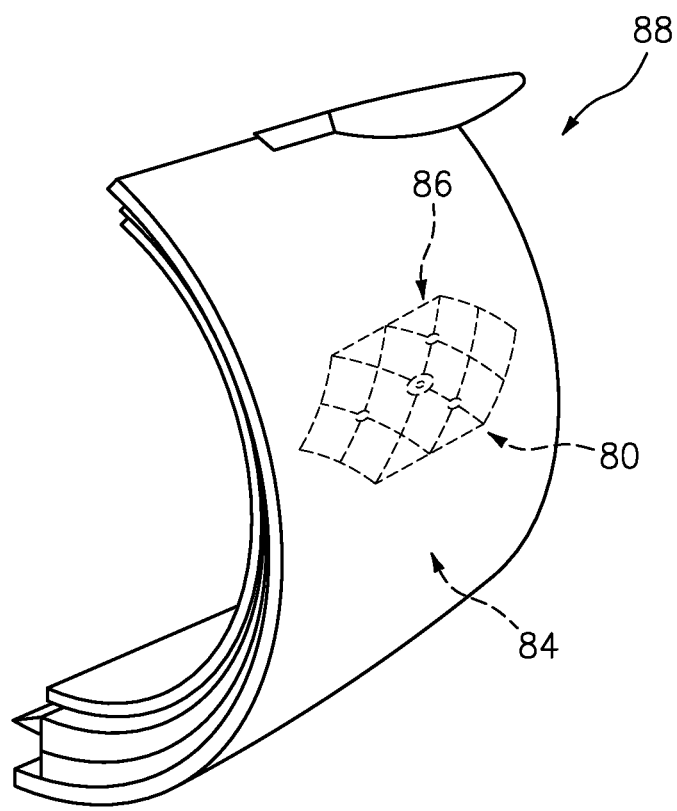
FIG. 13 illustrates an exemplary component including a sensor array, in accordance with one or more embodiments of the present disclosure.
Figure 14:
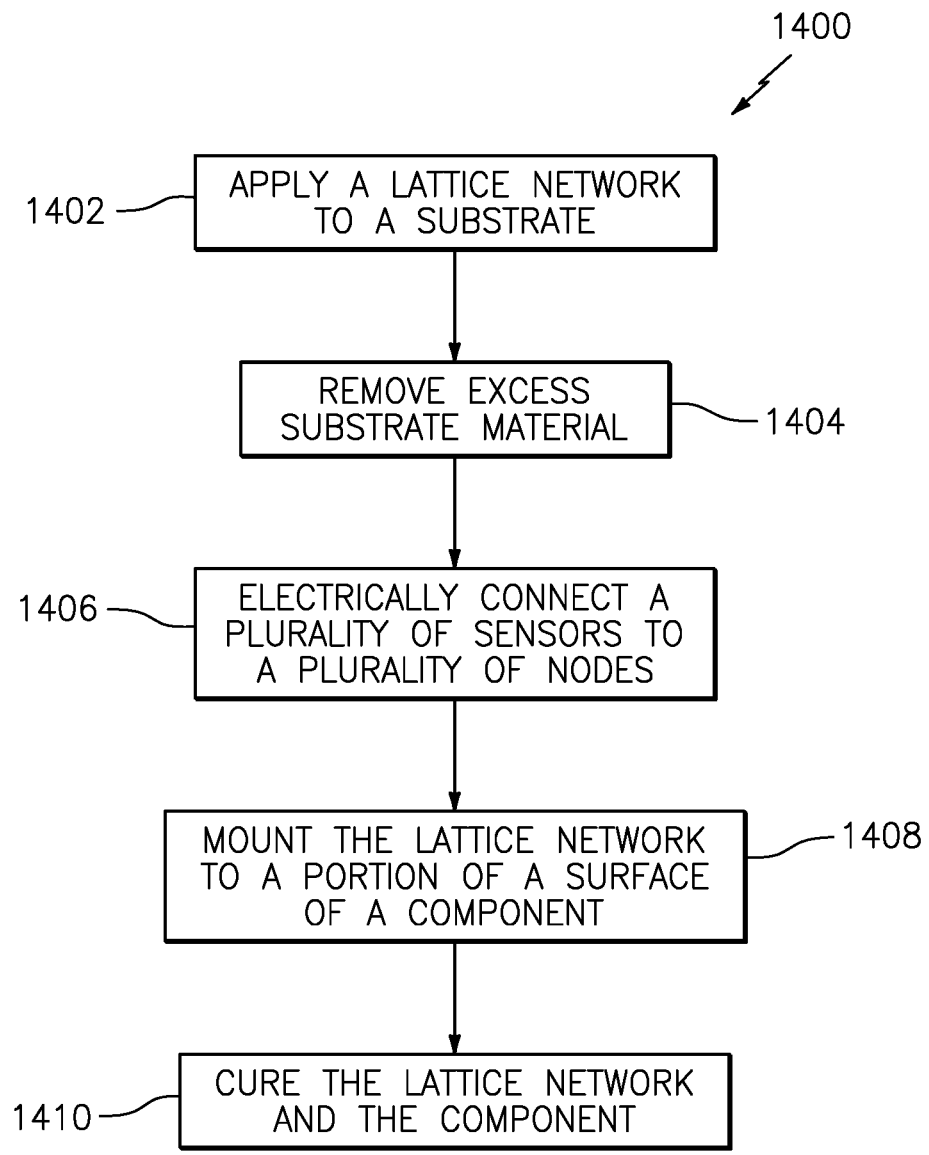
FIG. 14 illustrates a flowchart depicting a method for forming a sensor array, in accordance with one or more embodiments of the present disclosure.

In various embodiments, the plurality of cells 70 may be configured to form a honeycomb structure defined by a plurality of cells. The cells may include six side walls extending between the first side 72 and the second side 74 of the core structure 64. However, it should be understood that aspects of the present disclosure may be applied to cells having alternative configurations as well, for example, those having square, triangle, round etc. cross-sectional configurations having regular or irregular distributions. Additionally, in various embodiments, other core structure 64 types such as foams, lattices (additive or non-additive), etc. may be used. The plurality of cells 70 of the acoustic panel 60 provide resonant cavities (e.g., Helmholtz resonant cavities) that contribute to the dissipation of incident acoustic energy by attenuating acoustic reflected waves and/or converting acoustic energy into heat energy, such as by Helmholtz resonance. The cavities may include air or other materials. Preferable, the material in the cavity is different than a material from which the Referring to FIGS. 7 and 11-13, the gas turbine engine 10 includes a sensor array 80 coupled to a surface 84 of a component 82. A portion 86 of the surface 84 on which the sensor array 80 is coupled, may be planar or non-planar (e.g., a curved surface profile). The portion 86 of the surface 84 may correspond to all or less than all of a surface area of the surface 84. The surface 84 of the component 82 may include a skin such as a composite or plastic skin. The reference to a composite skin herein is for simplicity of description only and is not limiting. It will be understood that a composite skin may be or include a plastic skin or be of other non-composite materials without loss of generality. Material selection for the composite skin may be based on operating temperature requirements for the desired application of the composite skin. For example, the composite skin may include a polymer matrix composite (PMC) material. Other non-limiting examples of the composite skin may include, for example, reinforced plastic materials (e.g., fiber-reinforced plastics), thermosets, thermoplastics, or other suitable materials. Reinforcing fibers may include, for example, carbon fibers, glass fibers, aramid fibers, etc. In various embodiments, resins selected for the composite skin may be thermoset based for structural composites and may include, for example, benzoxazine resins, bis-Maleimide resins (BMI), cyanate ester resins, epoxy (epoxide) resins, polyimides, polyurethane (PUR) resins, phenolic (PF) resins, unsaturated polyester (UP) resins, silicones, and vinyl esters. In various other embodiments, the composite skin may be formed from thermoplastic resins that meet operating temperature requirements, for example, PEEK, PEKK, LMPAEK, etc. While the sensor array 80 of the present disclose will be explained with respect to application to the back skin 68 of the acoustic panel 60, it should be understood that the sensor array 80 may be applied to other components (e.g., large composite components) as well, such as, but not limited to, thrust reverser sleeves 88, passenger doors 90, nacelle surfaces (e.g., the nacelle 52), etc. For example, as shown in FIGS. 12 and 13, in various embodiments, the sensor array 80 may be disposed on a portion 86 of internal surface 84 of the thrust reverser sleeve 88, the passenger door 90, or other component (e.g., the sensor array 80 may be disposed within the thrust reverser sleeve 88 or the passenger door 90). In various other embodiments, the sensor array 80 may alternatively be disposed on an external surface 84 of the thrust reverser sleeve 88, the passenger door 90, or other component.

Figure 7:
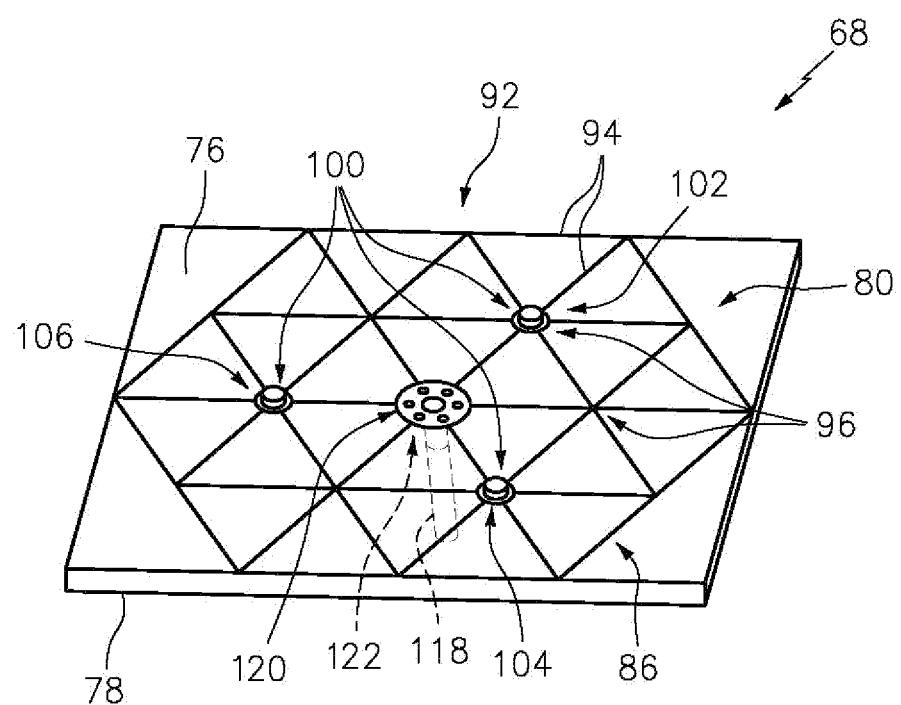
FIG. 7 illustrates a portion of a sensor array at a stage of manufacture, in accordance with one or more embodiments of the present disclosure.
Figure 8:
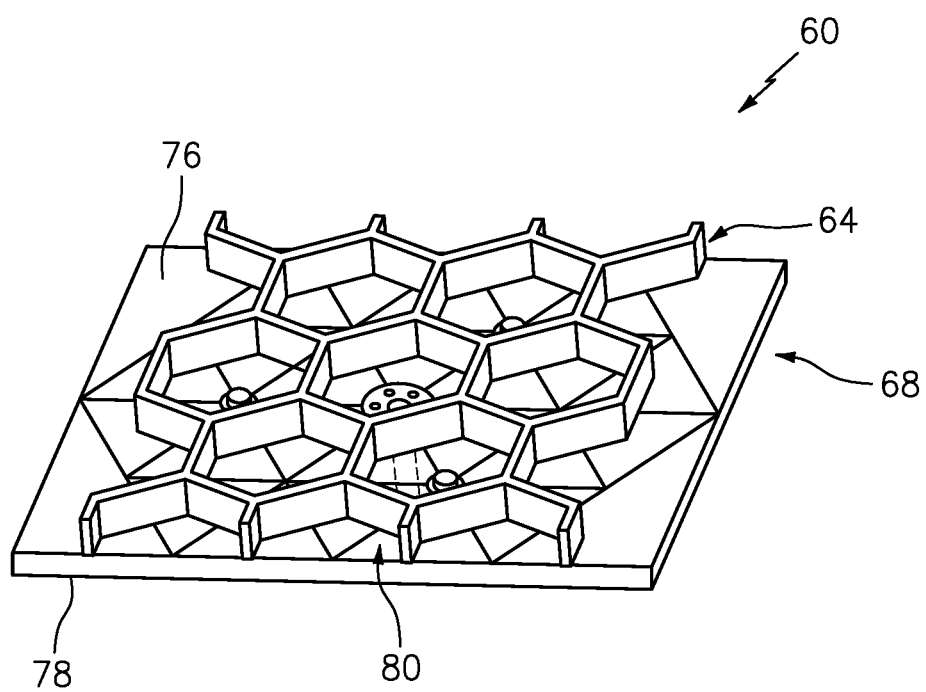
FIG. 8 illustrates a portion of a sensor array at a stage of manufacture, in accordance with one or more embodiments of the present disclosure.

Referring to FIG. 7, the sensor array 80 includes a lattice network 92 mounted to the portion 86 of the first side 76 of the back skin 68 (e.g., the composite skin). The lattice network 92 includes a plurality of interconnects 94 defining a lattice topology. The interconnects 94 are electrically-conductive strands that form the lattice network 94 and which can be deployed on, and conform to, a component surface (e.g., the back skin 68). The lattice network 92 includes a plurality of nodes 96. The plurality of nodes 96 are respectively defined by an intersection of two or more interconnects of the plurality of interconnects 94. In various embodiments, the nodes of the plurality of nodes 96 may be defined by an intersection of a greater number of interconnects of the plurality of interconnects 94, for example, three or more interconnects, four or more interconnects, five or more interconnects, six or more interconnects, etc.

As will be discussed in greater detail, the interconnects 94 may be formed from a conductive ink (e.g., an electrically conductive ink) which may be made from one or more of silver, copper, aluminum, gold, platinum, ruthenium, carbon, and/or alloys of these metals. In various other embodiments, the conductive ink may be made from these and/or other metals, alloys, partial conductors, and/or composites.

The sensor array 80 includes a plurality of sensors 100 electrically connected to the lattice network 92 at the plurality of nodes 96. For example, each sensor 100 of the plurality of sensors 100 may be electrically connected to the lattice network 92 at a respective node of the plurality of nodes 96. Accordingly, some or all of the nodes of the plurality of nodes 96 may have a respective sensor of the plurality of sensors 100 connected thereto. The orientation of the plurality of sensors 100 with respect to the lattice network 92 allows the plurality of sensors 100 to be spread over a large surface area of the back skin 68.

The plurality of sensors 100 may include one or more different types of detectors, for example, resistance temperature detectors (RTDs) 102, strain sensors 104, and/or piezoelectric sensors 106. RTD sensors 102 may provide a resistance (i.e., an electrical resistance) value that is indicative of a temperature. RTD sensors 102 may be used for the detection of thermal excursions (e.g., hotter than expected temperatures for a given gas turbine engine 10 operational condition), which can lead to damage of components such as, for example, the acoustic panel 60. Strain sensors 104 may provide a resistance signal that is representative of level of strain (i.e., mechanical strain) in a component such as, for example, the thrust reverser sleeve 88 or the passenger door 90 (see, e.g., FIGS. 12 and 13). Piezoelectric sensors 104 can provide a voltage signal that is representative of an impact (i.e., a mechanical impact, for example, foreign object damage (FOD) or a bird strike). In various embodiments, other types of sensors can be used to detect pressure, vibration, light (e.g., photons), sound (e.g., acoustic waves), magnetism (e.g., Hall Effect, magnetoresistive (MR) sensor), and radio frequency (RF) waves, for example.

Figure 9A:
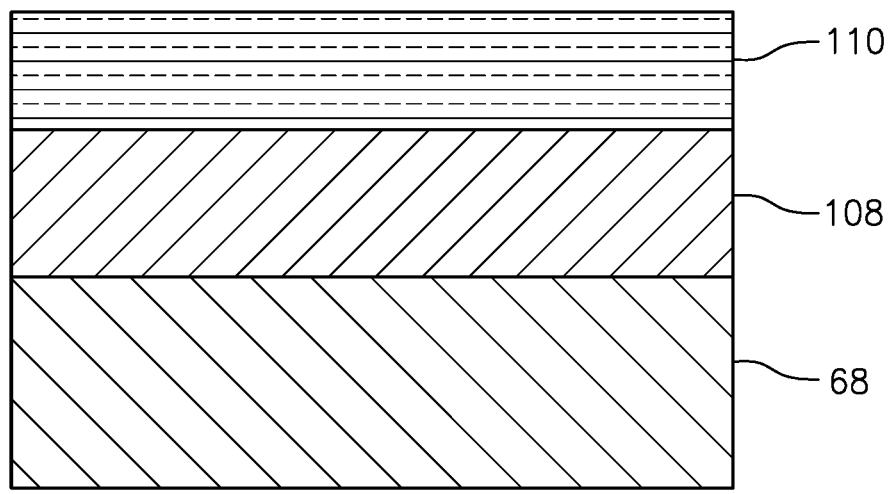
FIG. 9A-C illustrate cross-sectional views of layers of a sensor array, in accordance with one or more embodiments of the present disclosure.
Figure 9B:
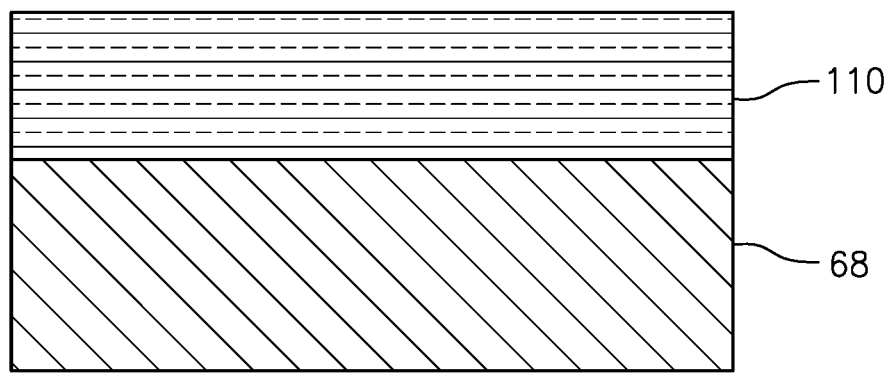
Figure 9C:
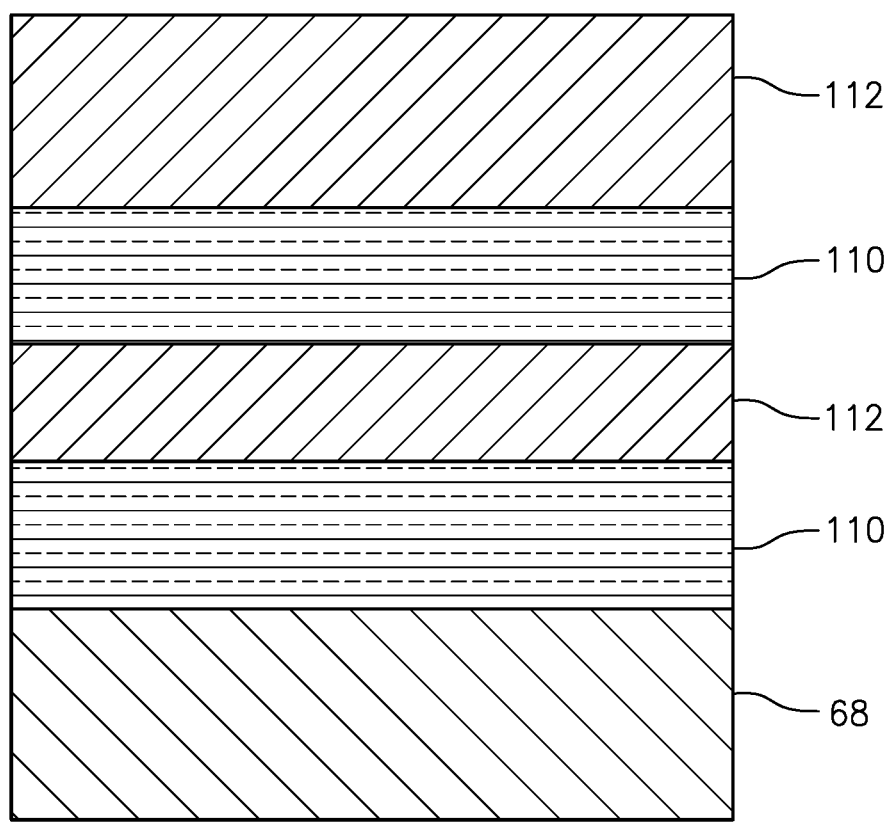

Referring to FIG. 9A-C, in various embodiments, the lattice network 92 may include a substrate 108 upon which the plurality of interconnects 94 and the plurality of nodes 96 are disposed. The substrate 108 may be in contact with and coupled (e.g., adhered, bonded, etc.) to the back skin 68 (see, e.g., FIG. 9A). In various embodiments, substrate 108 may be a dielectric material such as, for example, polyimide (e.g., KAPTON®), polyethylene terephthalate, or polycarbonate, thermoplastic, or cured resin material.

In various embodiments, the lattice network 92 may not include the substrate 108. Accordingly, the plurality of interconnects 94 and the plurality of nodes 96 may be coupled directly to the back skin 68 (see, e.g., FIG. 9B). In various embodiments, the lattice network 92 may include one or more additional layers such as, for example, one or more layers of conductive ink 110, which provides the plurality of interconnects 94, and one or more layers of an encapsulant 112 (see, e.g., FIG. 9C). In various embodiments, the encapsulant 112 may be a dielectric material. The encapsulant 112, as a dielectric material, may be configured to provide an electrically-insulating barrier between electrically-conductive components, for example, between layers of the conductive ink 110. In various embodiments, the encapsulant 112 may form an encapsulating layer over the lattice network 92, thereby protecting the lattice network 92.

In various embodiments, the encapsulant 112 may include, for example, photoset and/or thermoset polymer dielectric inks, extruded thermoplastics, or other suitable dielectric materials. The material and thickness of the encapsulating layer, formed by the encapsulant, may be determined by interconnect 94 mechanical, thermal, and electromagnetic requirements to ensure robust signal performance during operations (e.g., performance during thermal excursions and CTE-related strains).

Figure 10:
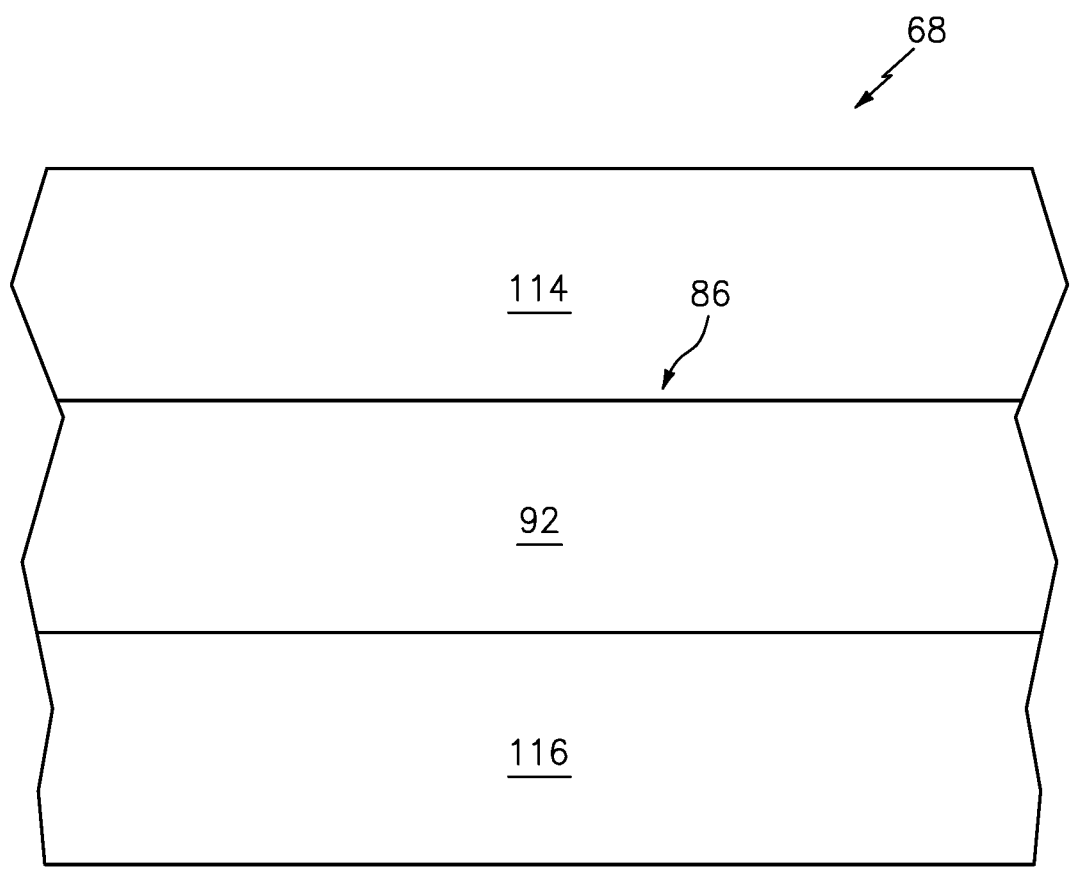
FIG. 10 illustrates an exemplary component skin including a sensor array, in accordance with one or more embodiments of the present disclosure.
Figure 11:
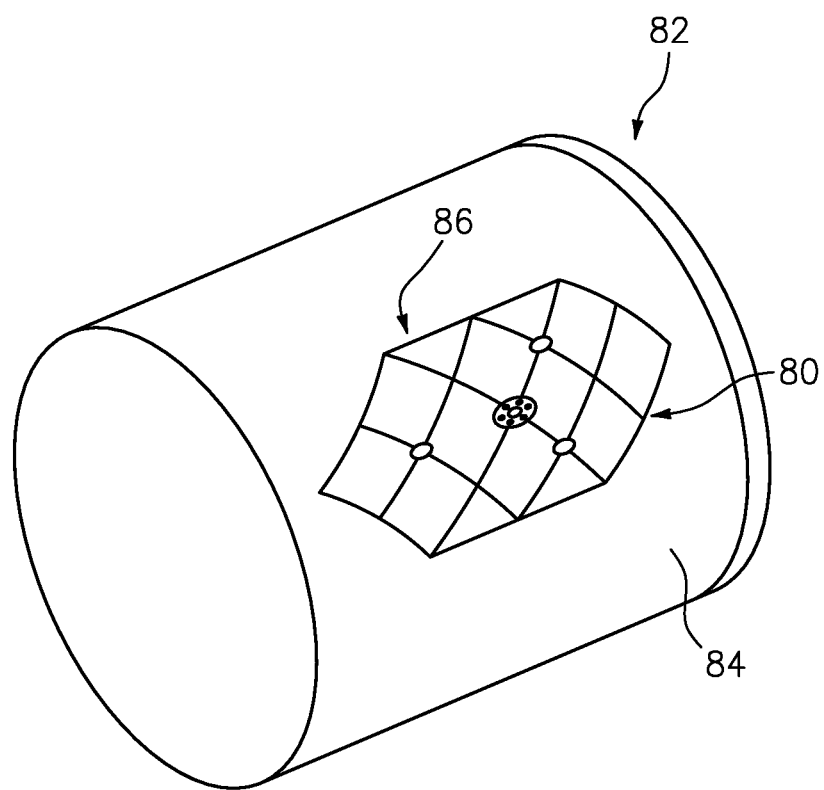
FIG. 11 illustrates an exemplary component including a sensor array, in accordance with one or more embodiments of the present disclosure.

Referring to FIG. 10, in various embodiments, the back skin 68 may include a first layer 114 and a second layer 116 applied to the first layer 114. The lattice network 92 may be coupled to the portion 86 of the back skin 68 between the first layer 114 and the second layer 116. In some embodiments, the first layer 114 and the second layer 116 are respectively composite materials.

Referring again to FIG. 7, in various embodiments, the lattice network 92 may be disposed on the portion 86 which may be located on the first side 76 of the back skin 68. In various other embodiments, the lattice network 92 may be disposed on the portion 86 which may be located on the second side 78 of the back skin 68. Accordingly, the sensor array 80 may be disposed between the thermal blanket 98 and the back skin 68.

The sensor array 80 may include an input/output circuit 120 electrically connected to the lattice network 92 at a node of the plurality of nodes 96. The back skin 68 may include an aperture 122 extending from the first side 76 to the second side 78 of the back skin 68 and having a location which corresponds to the location of the input/output circuit 120. The sensor array 80 may include a cable 118 electrically connected to the input/output circuit 120 and passing through the aperture 122. The cable 118 may be configured to electrically connect the sensor array 80 to a computing system, for example, an edge computing network.

Referring to FIGS. 4-9 and 14, a method 1400 for forming a sensor array, such as the sensor array 80, is provided. In Step 1402, the method 1400 includes forming the sensor array 80 by applying the lattice network 92 to the substrate 108 (see, e.g., FIG. 4). The lattice network 92 may be applied to the substrate 108 by printing (e.g., additively manufacturing) the plurality of interconnects 94, the plurality of nodes 96, and one or more encapsulating layers onto the substrate 108 with the conductive ink 110 and the encapsulant 112. As used in this disclosure, "printing" includes an additive-manufacturing process that can include to any of a number of processes that can deposit material for fabricating a component or components. The substrate 108 can, for example, include a plate, sheet, or continuous roll of material, and can be thick or thin, and/or rigid or flexible. In various embodiments, the substrate 108 can include a thin-film material on a roll, whereby the sensor array 80 is fabricated using a roll-to-roll (R2R) manufacturing process. In other various embodiments, the substrate 108 can include a sheet of rigid or semi-rigid material, whereby the sensor array 80 is fabricated using a large screen printing manufacturing process. The lattice network 92 that provides the sensor array 80 can be provided by one of several possible additive manufacturing and/or printing methods, with non-limiting examples including screen printing, R2R, gravure printing, ink jet printing aerosol jet (AJ) deposition, material extrusion, extrusion direct-write microdispensing, ink jet printing, and thermal-spray deposition.

Figure 5:
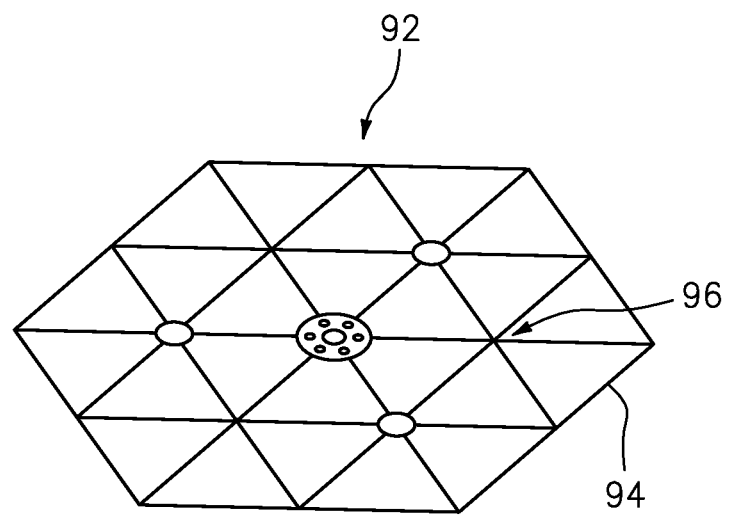
FIG. 5 illustrates a portion of a sensor array at a stage of manufacture, in accordance with one or more embodiments of the present disclosure.

In Step 1404, the method 1400 includes removing some or all of the substrate 108 from the sensor array 80 (see, e.g., FIG. 5 illustrating removal of all of the substrate 108). In various embodiments, excess substrate material may be cut from the substrate 108 after applying the lattice network 92 to the substrate 108 and before mounting the lattice network 92 to the portion 86 of the back skin 68. In various embodiments, cutting the excess substrate material from the substrate 108 may involve laser cutting the excess substrate material. In various embodiments, substantially all of the substrate 108 that is not in contact with the plurality of interconnects 94 and the plurality of nodes 96 may be excess substrate material. In various embodiments, the substrate 108 may include a sacrificial substrate and some or all of the substrate 108 may be chemically removed from the lattice network 92 after applying the lattice network 92 to the substrate 108 and before mounting the lattice network 92 to the portion 86 of the back skin 68. Alternatively, the substrate 108 may be chemically removed from the lattice network 92 concurrent with mounting the lattice network 92 to the portion 86 of the back skin 68 (see Step 1408, discussed below) as the lattice network 92 may be fragile without the substrate 108. In various embodiments, a sacrificial film may be disposed between the substrate 108 and the lattice network 92 as lattice network 92 is printed onto the substrate 108. The lattice network 92 may be removed from the substrate 108, for example by chemically removing the sacrificial film, thereby leaving the substrate 108 intact.

Figure 6:
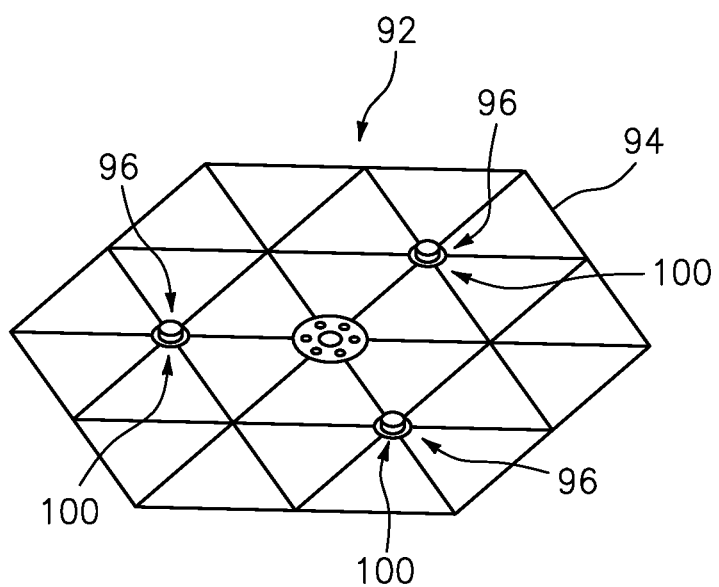
FIG. 6 illustrates a portion of a sensor array at a stage of manufacture, in accordance with one or more embodiments of the present disclosure.

In Step 1406, the method 1400 includes electrically connecting the plurality of sensors 100 to the lattice network 92 at the plurality of nodes 96 (see, e.g., FIG. 6). For example, the plurality of sensors 100 may be deposited onto respective nodes of the plurality of nodes 96 using a pick-and-place (PnP) manufacturing process.

In Step 1408, the method 1400 includes mounting (e.g., attaching or applying) the lattice network 92 to the portion 86 of the back skin 68 (see, e.g., FIG. 7) by, for example, manual placement of the lattice network 92 (e.g., by hand lay-up), automated placement of the lattice network 92 (e.g., by a pick-and-place method), direct additive manufacturing, etc. However, it should be understood that the lattice network 92 may be mounted to the portion 86 by any suitable method. As noted above, the flexible lattice network 92 may conform to planar or non-planar surfaces and may be applied to all or less than all of a particular surface. For example, the lattice network 92 may be mounted to an entire surface (e.g., sides 76, 78) of the back skin 68. In various embodiments, Step 1408 may further include one or more additional steps as required by the particular component to which the lattice network 92 is mounted. In various embodiments, the core structure 64 of the acoustic panel 60, may be mounted to first side 76 of the back skin 68 on top of the sensor array 80 (see, e.g., FIG. 8).

In various embodiments, Step 1408 may include mounting the lattice network 92 to the back skin 68 with the lattice network 92 and the back skin 68 in an uncured state. Accordingly, in Step 1410, the method 1400 may include curing the lattice network 92 and the back skin 68 simultaneously (e.g., co-curing the lattice network 92 and the back skin 68) thereby eliminating separate curing cycles and improving manufacturing speed. For example, in various embodiments, the lattice network 92 along with one or more of the face skin 66, the back skin 68, the core structure 64, and any adhesives used to bond two or more of the previously noted materials may be co-cured in the same autoclave cycle. However, in various other embodiments, Step 1410 may include curing the lattice network 92 and the back skin 68 separately. In various embodiments, the curing process may include an autoclave configured to apply heat (e.g., 250-350 F) and pressure (e.g., 15-200 PSI) to the components to be cured. In various other embodiments, curing may be performed, for example, with an oven, heated tooling, or open air tooling with vacuum-bag-only compaction.

As one of ordinary skill in the art will understand, the above-discussed steps of method 1400 may be performed in various orders and should not be understood to be limited to a particular order unless a requirement for a particular order is expressly stated.

The sensor array 80 according to embodiments of the present disclosure may provide the ability to embed a large number of sensors, along with the associated electronics and wiring, while reducing added weight and presenting limited or no adverse effect on structural properties of the components to which they are attached. The sensor array 80 can be placed over a broad surface area of varying curvatures, reducing the need for manual inspections of components, thereby reducing the necessity for long maintenance, repairs, and operations (MRO). Further, the sensor array 80 can be formed using an additive manufacturing process for low-cost implementation and less wasted materials.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A gas turbine engine comprising:
    an engine core having a longitudinal center axis;
    a non-rotating, inner structure disposed circumferentially about the engine core; and
    an acoustic panel coupled to a surface of the inner structure, the acoustic panel including a back skin adjacent the inner structure, a face skin, and a core structure disposed between the back skin and the face skin, the acoustic panel further comprising a sensor array comprising:
        a lattice network mounted directly onto a portion of the back skin, the lattice network including a plurality of interconnects and at least one node defined by an intersection of two or more interconnects of the plurality of interconnects; and
        a first sensor electrically connected to the lattice network at a first node of the at least one node.

2. The gas turbine engine of claim 1, wherein the portion of the back skin is disposed on a side of the back skin facing the core structure.

3. The gas turbine engine of claim 1, further comprising a thermal blanket disposed between the inner structure and the acoustic panel.

4. The gas turbine engine of claim 3, wherein
the portion of the back skin is disposed on a side of the back skin facing away from the core structure, and
the sensor array is disposed between the thermal blanket and the back skin.

5. The gas turbine engine of claim 1, wherein the first sensor is a temperature sensor.

6. The gas turbine engine of claim 5, wherein the sensor array further comprises a second sensor electrically connected to the lattice network at a second node of the at least one node, wherein the second sensor is different than the first sensor.

7. The gas turbine engine of claim 6, wherein the second sensor includes a strain sensor or a piezoelectric sensor.

8. A gas turbine engine comprising:
a bypass air duct;
an engine core having a longitudinal center axis;
a non-rotating, inner fixed structure disposed circumferentially about the engine core, the inner fixed structure disposed radially inward of the bypass air duct; and
a composite skin directly coupled to the inner fixed structure radially inward of the bypass air duct, the composite skin further comprising a sensor array comprising:
a lattice network mounted directly onto a portion of the composite skin, the lattice network including a plurality of interconnects forming a plurality of nodes, each node of the plurality of nodes defined by an intersection of two or more interconnects of the plurality of interconnects; and
a plurality of resistance temperature detectors, each resistance temperature detector of the plurality of resistance temperature detectors electrically connected to the lattice network at a respective node of the plurality of nodes.

9. The gas turbine engine of claim 8, further comprising a thermal blanket disposed between the inner fixed structure and the composite skin.

10. The gas turbine engine of claim 9, wherein the sensor array is disposed between the composite skin and the thermal blanket.

11. The gas turbine engine of claim 8, further comprising a computing system electrically connected to the sensor array, the computing system configured to detect a thermal excursion for an operational condition of the gas turbine engine with an electrical resistance value provided by the plurality of resistance temperature detectors.

12. The gas turbine engine of claim 8, wherein the sensor array further includes an input-output circuit electrically connected to the lattice network at a second node of the plurality of nodes, wherein the input-output circuit includes at least one of an input circuit and an output circuit.

13. The gas turbine engine of claim 12, wherein: the composite skin includes an aperture extending through the composite skin at a location proximal to the second node, and the input-output circuit includes at least one conductor extending through the aperture.

14. The gas turbine engine of claim 8, wherein the surface of the composite skin is a non-planar surface.

15. The gas turbine engine of claim 8, wherein: the composite skin includes a first layer and a second layer adjacent to the first layer, the first layer including the surface of the composite skin, and the lattice network is coupled to the portion of the composite skin between the first layer and the second layer.

* * * * *